March 13, 1934.                J. KLEFFMAN                1,951,295
                                  TRAP
                             Filed June 16, 1932
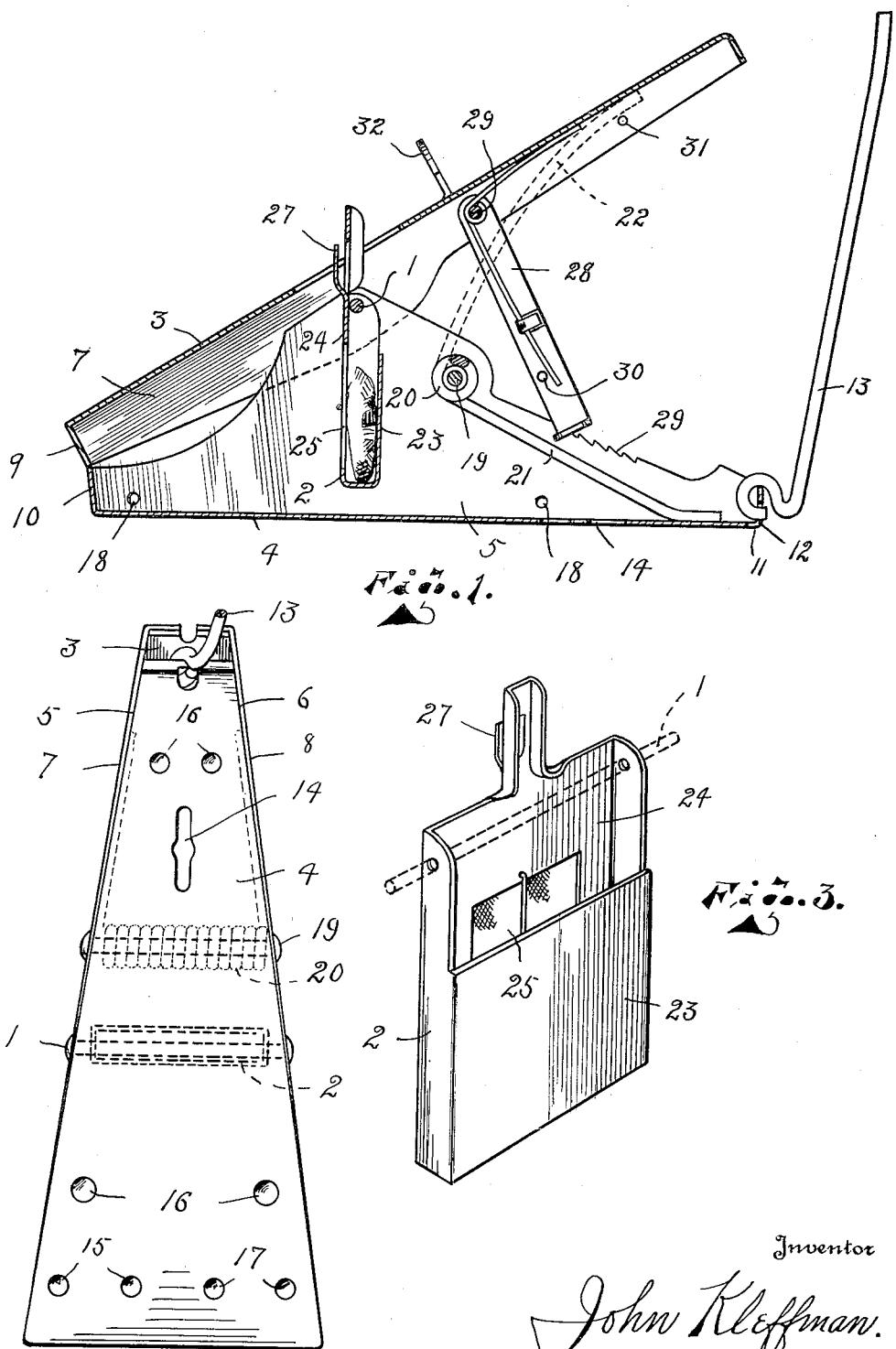

Patented Mar. 13, 1934

1,951,295

UNITED STATES PATENT OFFICE 1,951,295

TRAP

John Kleffman, Hibbing, Minn.

Application June 16, 1932, Serial No. 617,517

2 Claims. (Cl. 43—81)

This invention relates to animal traps and has special reference to one particularly adapted for use in the catching of house vermin, such as rats and mice, and may be made of various sizes for such purpose.

The principal object of the invention is to produce a more practical and durable trap of this character than heretofore known.

Another object is to produce such a trap that is free from the annoyance and danger of injury to one setting, baiting, or otherwise manipulating the same, such latter advantageous feature resulting from the fact that the trap is novel in that both the baiting and setting is accomplished remote from the jaws of the trap.

Still another object is to provide such a trap which may be placed horizontally or vertically as desired.

Another object of the instant invention is that of the general external shape of the trap in that it is of convenient form for handling in one hand either when setting or otherwise manipulating same.

Referring now to the accompanying drawing forming part of this application, and wherein like reference characters indicate like parts:

Figure 1 is a vertical central section, through one of the improved traps as it appears sprung.

Figure 2 is a bottom plan view of Figure 1; and

Figure 3 is an enlarged perspective view of the bait trigger.

The body portion of the trap is composed of two substantially channel-like members, stamped from preferably galvanized sheet metal and pivotally united as by the through pin 1, and which pin also functions as a pivotal support for the trigger 2. 3 represents the flat top of the uppermost member of the trap and 4 the flat bottom of the lowermost member, while 5 and 6 are the sides of the latter and 7 and 8 the side members of the former. As is obvious the pin 1 passes through the overlapping sides of the two members, the sides of the lower one being within the sides of the upper member.

Both upper and lower members are provided with parallel angular flange-like jaws 9 and 10, respectively, which, when the trap is closed, abut each other and hold therebetween the animal when caught. These jaws may be serrated or otherwise shaped for the specific results desired, though, ordinarily, the straight jaws are ample to act as an almost instant killer of the animal caught.

For inexpensive construction, convenience in handling, and minimum space necessary, both upper and lower members of the trap are tapered towards the tail end of the trap, and at such terminus the lower member is turned up at right angles as at 11, the same being slotted as at 12 for the pivotal connection of the eye of the trigger wire 13. Through the bottom 4 of the trap and approximately midway between the pivotal pin 1 and the rearmost end of the trap is formed the elongated slot 14 with an enlarged central portion for convenience in slipping over the projecting head of a nail for example in suspending the trap upon an object and a plurality of other preferably round holes as indicated at 15, 16, and 17, are also provided for convenience in wiring or otherwise attaching the trap to an object, for example likened to a log or standing trunk of a tree, and there are also suitable holes such as indicated at 18 through the sides of the trap for a similar purpose.

This trap is novel in that the pin upon which the jaws are pivotally united freely supports the trigger and is free from encumbrance by the spring of the trap as well as providing greater leverage for the spring which is mounted upon the pin 19 in the rear of the pivotal pin 1. By this arrangement the trap as viewed from the open jaws presents little if any suspicious mechanism, the bow like bait trigger being substantially the full size of the throat thereof, and in fact the entire rear portion of the trap may be materially blinded as by straw, hay, or the like.

A further advantage of having the trigger support function as the pivotal connection of the two parts of the trap is obvious in the ready assembly of same, as the two parts may be united with no stress whatever thereupon, when subsequently the spring may be positioned and its pin applied.

The main spring of the trap is illustrated at 20, and, as previously inferred, is mounted upon the pin 19 with one end 21 impinging against the tail end of the bottom 4, while the opposite end 22 is stressed against the inner face of the tail of the top 3, so that the two tail portions of the trap are biased in their separated position which closes the jaws thereof; and, of course, the force of the trap is governed by the strength of the spring.

The trigger 2 of this trap is similar in construction to that shown in my copending application Serial No. 617,518; however differs in that the rear wall 23 thereof is materially lower than the front wall 24 so as to permit of the baiting of the trap from intermediate of the spread or opened tail portions thereof so that any danger of injury from the accidental springing of the trap is eliminated. The front wall 24 of the bait box is provided with a suitable screened opening indicated at 25 for viewing of the bait by the animal to be caught.

An added feature of this trigger is that the hole in the stem end thereof for reception of the free end of the trip bar 13 is produced by the struck out tongue portion 27 from the stem, and which tongue is spaced the proper distance from the back of the stem so that the bar cannot be thrust too far through the hole but may readily be jammed up tight against the end of the bar when the trap is being set, thus freeing same from the necessity of delicate adjustment so dangerous in similar devices.

I have shown the pivotal spring stressed locking lever 28 mounted upon the pin 29 and normally biased for cooperative engagement with the ratchet teeth 29 on the upper edge of one side of the trap so that the latter is locked in any closed position which might occur in the catching of an animal, and this trigger may be held out of action as by insertion of a pin or nail through the holes 30 and 31 when they are caused to register by the closing up of the dog lever 28; this structure, however, being more clearly illustrated and claimed in my copending application, supra.

In the setting of the trap a further provision for safety is made by striking upwardly from the top 3 and rearwardly of the protruding stem and trigger the hook like member 32 under which the setting bar 13 is engaged when desired before connecting the trigger stem therewith; such a device however is known to be old in the art.

Attention is again directed to the advantage of the peculiar shape of the trap which provides for the convenient squeezing together of the tail portions of one end while the trigger and trip bar are being manipulated, thereby diminishing possibility of injury by the accidental spring of the trap. This is true also in the placing of the trap, after being set, in the runway or path for example of the animal to be caught, as it is well known that during such placing of a trap the same is frequently accidentally sprung to the annoyance and sometimes injury of the person involved.

I claim:

1. An animal trap comprising in combination a box-like base portion having triangularly shaped side members, and a flat bottom, and being materially less in width at its tail or rear end than at its jaw or front end, a similarly shaped cover member, the side walls of which overlap the side walls of the base portion, a transverse pin through the overlapping side walls of the members approximately midway their ends, a second transverse pin carried in the side walls of the base portion, an expansive helical spring carried upon the second pin for biasing the trap to sprung position, a bait carrying trigger pivoted upon the first mentioned pin, and a holding bar pivoted to the tail of the base member and designed to overlap the tail of the cover member, for engagement with the upper end of the trigger when the trap is set.

2. A trap of the type described comprising two channel shaped members having major jaw portions and minor tail portions, a bait carrying trigger, means pivotally uniting said members intermediate of their ends, said means acting as a pivotal support for said trigger, an actuating spring carried intermediate of the members and rearwardly of the trigger, and a trip bar pivoted in the minor end of one member for setting the trap, and locking means extending upwardly from the top channel member for optional engagement with the trip bar when the trap is set, permitting of free manipulation of the trigger.

JOHN KLEFFMAN.